May 5, 1936.　　　M. H. GRAHAM　　　2,039,956
AUTOMATIC TOASTER
Filed Sept. 19, 1932　　　4 Sheets-Sheet 1

INVENTOR
MAURICE H. GRAHAM
ATTORNEYS

May 5, 1936.                M. H. GRAHAM                2,039,956
                           AUTOMATIC TOASTER
                         Filed Sept. 19, 1932           4 Sheets-Sheet 2

INVENTOR
MAURICE H. GRAHAM
By Paul Paul Moors
ATTORNEYS

May 5, 1936.　　　　M. H. GRAHAM　　　　2,039,956
AUTOMATIC TOASTER
Filed Sept. 19, 1932　　　4 Sheets-Sheet 3

INVENTOR
MAURICE H. GRAHAM
By Paul, Paul & Moore
ATTORNEYS

May 5, 1936.  M. H. GRAHAM  2,039,956
AUTOMATIC TOASTER
Filed Sept. 19, 1932  4 Sheets-Sheet 4
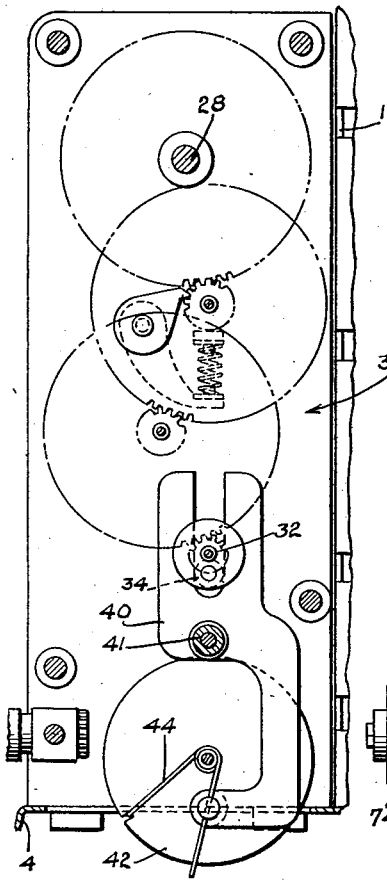
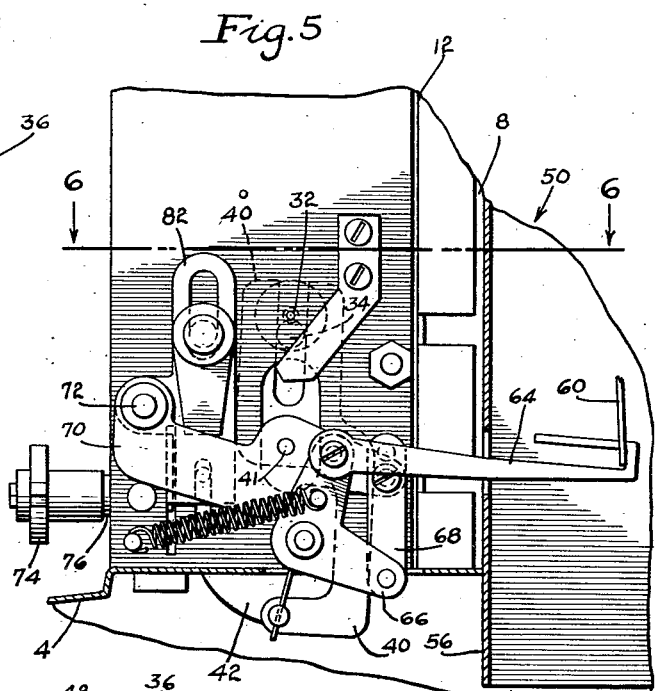
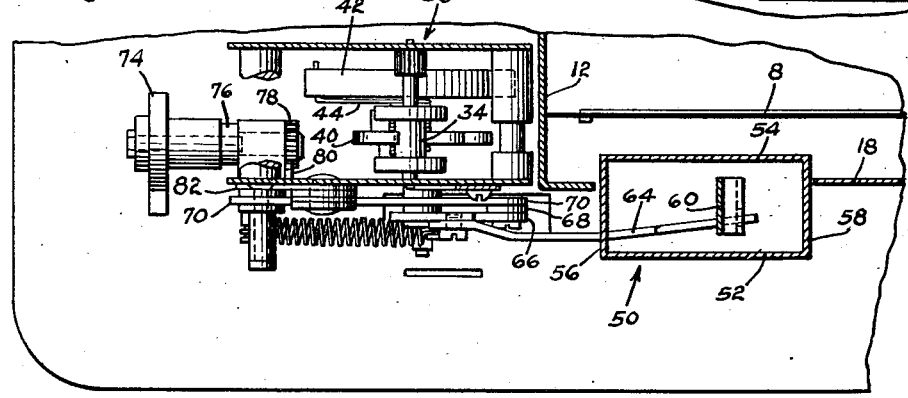
INVENTOR
MAURICE H. GRAHAM
By Paul, Paul & Moore
ATTORNEYS Patented May 5, 1936

2,039,956

UNITED STATES PATENT OFFICE 2,039,956

AUTOMATIC TOASTER

Maurice H. Graham, St. Louis Park, Minn.

Application September 19, 1932, Serial No. 633,765

13 Claims. (Cl. 219—19)

This invention concerns itself with toasters and more particularly with bread toasters which are automatically operative to control the toasting operation. Various types of automatic toasters have heretofore been proposed and among these types may be mentioned that provided with a clock mechanism with manual means only for regulating the same, and the types involving use of surface temperature of the bread, its moisture content and its interior temperature. Another type of automatic toaster is one wherein a clock or other timing mechanism is automatically controlled or regulated by means of a thermally responsive device. The present invention relates more specifically to the latter type of automatic toaster.

Previous toasters of this type have embodied the use of thermally responsive devices which are subject to the heat of the oven in which the toasting operation is carried out, but a toaster constructed in accordance with the present invention includes a thermally responsive member which is not directly subject to oven heat but which is affected by the heat of a separate heating device which is operated with the heating device within the toasting chamber or oven of the toaster. Preferably, the main heating element of the toaster is electrical and the supplemental heating element for the thermally responsive device is also electrical and connected in circuit with the main heating element, thereby to be turned on and off with the main heating element and to simulate the conditions of heat developed in the toasting chamber by the main heating element.

In a toaster so constructed that the thermostat is directly subjected to oven heat it is difficult to produce a design which will eliminate possibility of the thermostat or its associated mechanism becoming clogged or incrusted with bread particles. By providing a separate heating element which operates with the heating element in the oven and which produces convection currents separate from any which may be created by the oven, it is a simple matter to remove the thermally responsive mechanism from a position in which it might become clogged with bread particles, and it is furthermore simple to operate successfully with a toaster which is so designed as to shield the oven from draft or convection influences between and/or during toasting operations.

The various aspects of the invention will be more clear upon the consideration of an embodiment of the invention which will be described in the specification and drawings, but it will of course be understood that this merely represents one application of the principles underlying the invention.

Referring more particularly to the drawings,

Figure 5 is a fragmentary view showing the mechanism for adjusting the variable speed clock by means of the thermally responsive device;

Figure 6 is a cross-section along the line 6—6 of Figure 5;

Figure 7 is a cross-section along the line 7—7 of Figure 1 and is a view of the timing mechanism; and, Figure 8 is a wiring diagram showing the manner in which the heating elements are connected.

Figure 1:
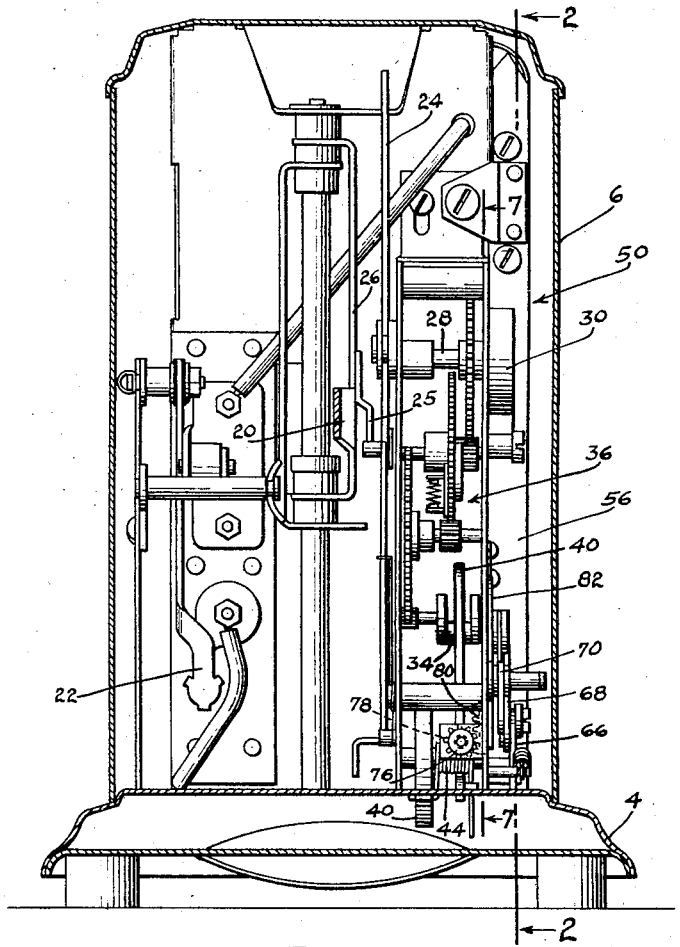
Figure 1 is a front view of the toaster, the casing being broken away in order to more clearly disclose the mechanism therein.

In the drawings, there is shown an automatic toaster having a base member 4 formed of stamped sheet metal or the like and having an outer casing 6 which is also formed of stamped sheet metal. Within the casing 6 there is arranged a pair of heating elements 8 and 9 between which bread slices to be toasted are moved upon the bread carrier 10. The heating elements are disposed within a toasting chamber or oven formed by the sheet metal end walls 12 and 14 and by the sheet metal side walls 16 and 18.

A handle 20 extends outside of the casing 6 and has mechanism associated therewith for winding a timing mechanism shown more particularly in Figures 1, 2, 5, 6 and 7, for depressing the bread carrier 10 and for closing an electrical switch 22. The specific structure will not be described since it forms no part of the present invention and is fully described in two pending applications of Murray Ireland, the first of which is entitled "Toasters", Serial Number 437,071, and was filed March 19, 1930; and the second of which is entitled "Timing mechanism", Serial Number 457,893, and which was filed on May 31, 1930. The first application shows the various details of the particular toaster to which the present invention is applied, and the second application fully discloses in detail a timing mechanism which constitutes a variable speed clock and is of the same type as that applied to the present toaster.

In the operation of the toaster, a bread slice is placed upon the carrier 10 while it is in uppermost position. The handle 14 is then depressed, whereupon the carrier 10 is moved into lowermost position and the bread is moved completely into the oven between the heating elements. In the course of the downward movement of the handle, a main switch 22 for the heating elements is automatically closed, and when the carrier reaches lowermost position it is held therein by a catch member later released by the timing mechanism. Upon release of the catch member the bread carrier is moved back into uppermost position by means of the spring 19 and associated mechanism shown in the prior applications. During the upward movement of the bread carrier, the main switch 22 for the electrical heating elements 8 and 9 is also opened.

The spring of the timing mechanism is wound by means of a rack 24 which has attached thereto a stud or pin which is engaged by a member 25 fixed on the slide 26 to which the handle 20 is attached. When the handle is depressed, the lower surface of the member 25, which is preferably V-shaped, engages the stud or pin and pulls down the rack 20, thereby rotating the spring shaft 28 and energizing the spring 30 of the timing mechanism. As the spring unwinds it raises the rack 24, thereby also raising the slide 26 and member 25. The latter is provided with an upper cam surface which engages a catch for holding the bread carrier in lowermost position and operated to release the bread carrier so that it may move to uppermost position after a predetermined amount of travel on the part of rack 24. By varying the speed with which the spring unwinds and the clock mechanism raises the rack 24, the time during which the bread carrier is held in lowermost position and the bread slices consequently held in the oven may thus be governed.

As the spring 30 unwinds, it rotates a shaft 32 having a cam 34 fixed thereon, by means of a gear train generally designated at 36. The cam 34 operates within the forked end of an oscillator 40 which is pivotally mounted on a pin 41 and has one end attached to a balance wheel 42, by means of a spring 44. By varying the position of the pivoted oscillator 40 with respect to the cam 34 and balance wheel 42, the speed of the timing mechanism may be varied. The foregoing structure is all fully described in the Ireland applications above referred to, and therefore need not be described with further particularity. It is sufficient to note that a variation of the position of the pin 41 upon which the oscillator 40 is mounted results in a variation of the time during which the bread carrier 10 holds a bread slice within the oven, and during which the heating elements are energized.

Figure 8:
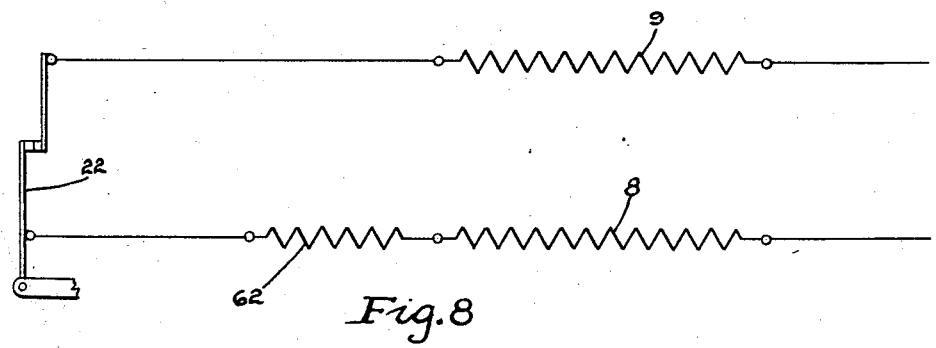

At one end of the sheet metal wall 18 of the toasting chamber, there is provided an elongated tubular chamber 50, substantially rectangular in cross-section, which is formed of side walls 52 and 54 and end walls 56 and 58. The casing 50 is located inside of the outer casing 6 of the toaster and its wall 54 comprises substantially a continuation of the wall 18, although it will of course be understood that if desired the wall 18 may be continuous and the casing 50 may be located outside of this wall. Secured to the wall 56 of the chamber 50 there is a mounting 59 for a thermostatic member 60 which is adapted to warp into the dotted line position shown in Figure 2 upon being heated. The wall 58 has mounted thereon a heating element 62 which is suitably insulated and the heating element 62 supplies the heat controlling the movement of the thermostat 60, it being noted that the thermostat is directly subject to the radiant heat of the element. As shown in Figure 8, the heater 62 is connected in circuit with the toast heating elements 8 and 9 and all of these heaters are controlled by the main switch 22.

Figure 2:
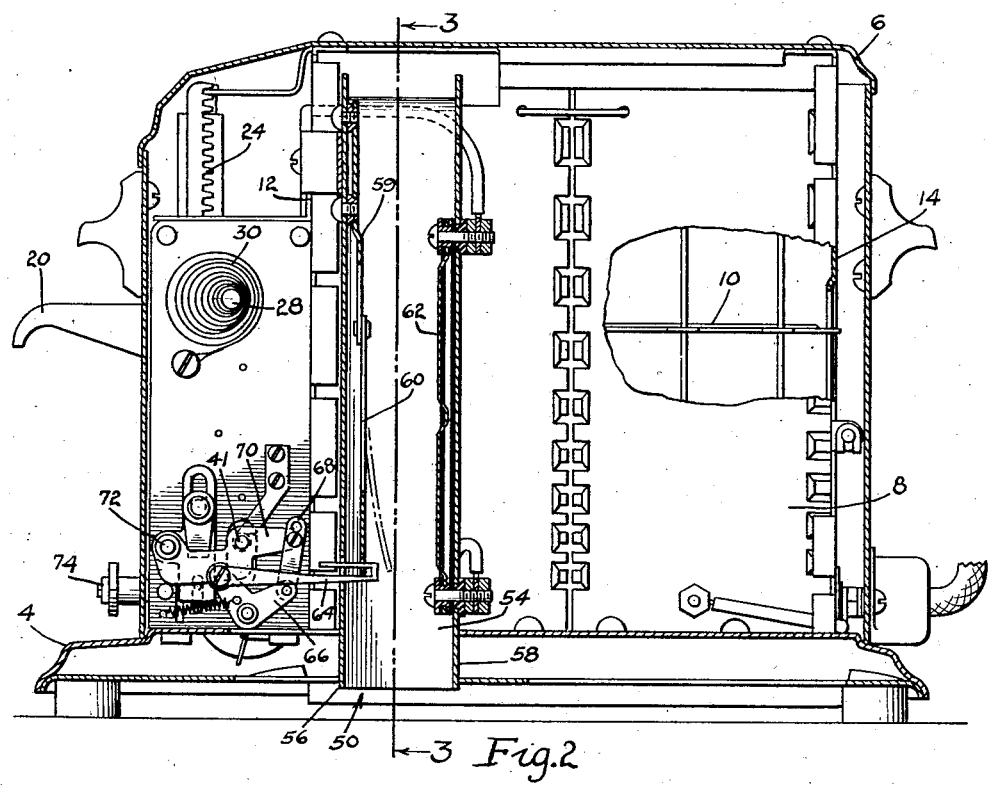
Figure 2 is a cross-section along the line 2—2 of Figure 1.
Figure 4:
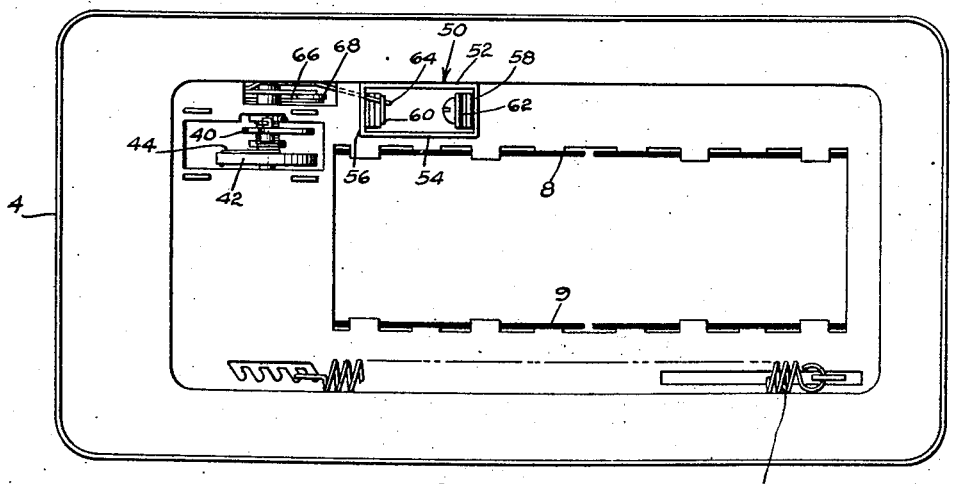
Figure 4 is a bottom plan view of the toaster.
Figure 3:
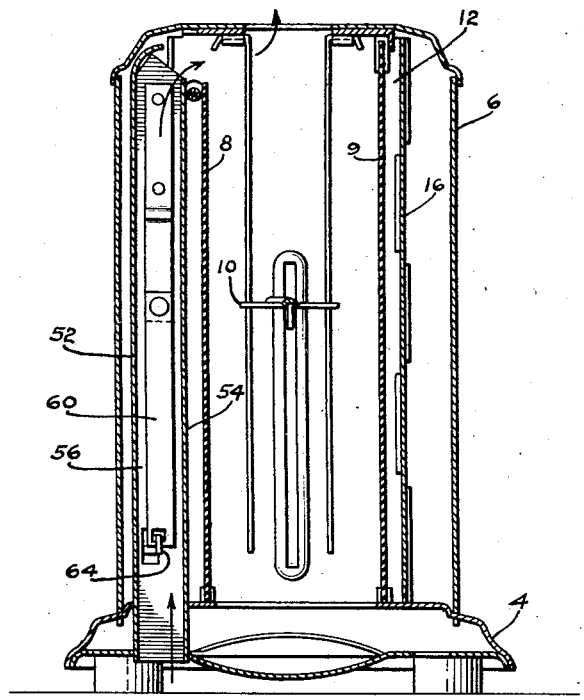
Figure 3 is a cross-section along the line 3—3 of Figure 2.

The thermostat 60 has a lost motion connection with the hooked end of a lever 64 which has its other end connected to one arm of a bell crank lever 66. The other arm of this bell crank lever is connected to a link 68 which in turn is connected to the free end of a lever 70 pivoted at 72. Lever 70 carries the pin 41 upon which the oscillator 40 is pivoted. Upon a heating of the thermostat 60, it will move to the right, as shown in Figure 1, and cause a rotation of lever 70, with the result that the position of the oscillator 40 in respect to the cam 34 will be varied and the speed of the timing mechanism will accordingly be varied. As shown in Figure 2, wherein the thermostat is shown in full lines in the position it occupies when at room temperature, the thermostat must move some distance before it takes up the lost motion in its connection to the lever 64 and begins regulating the speed of the clock mechanism. This is to insure that the toaster will operate at slow speed while cold. After being heated, the thermostat 60 operates to increase the speed of the timing mechanism and thereby shortens the period during which bread is held within the oven. It will be understood that the lost motion connection may be dispensed with or varied at will in accordance with the various features of design.

The speed of the clock may also be controlled manually. The knob 74 extends outside of the casing 6 and is fixed on a shaft 76, also carrying a gear wheel 78, which meshes with a rack 80 fixed to the member 82 to which the lever 70 is pivoted. Manipulation of the knob 74 will cause a shifting in the position of pivot 72 and will consequently vary the position of the oscillator 40 in respect to the cam 34.

The operation of the device is as follows: A bread slice is placed upon the bread carrier 10 and the handle 20 is thereupon depressed with the result that the bread carrier will move down to carry the bread into the oven, the spring of the timing mechanism will be wound, and the main switch 22 of both the toast heating elements 8 and 9 and the heater 62 in the chamber 50 will be closed. As current begins to flow, the toast heating elements 8 and 9 will begin to heat up and the heating elements 62 will likewise become heated, with the result that the bi-metal thermostatic member 60 will warp and operate to increase the speed of the timing mechanism. When the timing mechanism has raised rack 24 a predetermined amount, the bread carrier will be released and moved to uppermost position, and the main switch will automatically open.

If the toaster is not allowed to cool completely before a second slice of bread is inserted, the heating element 62 and chamber 50 will also not have cooled completely, with the result that thermostat 60 will still retain some heat. Therefore, the member 60 will increase the average speed of the timing mechanism and the timing period for the second slice will be less than the period of the first slice and with succeeding slices the timing period will depend upon the initial temperature of the thermostat 60 which is dependent upon oven conditions.

The parts are so designed that the temperature of thermostat 60 will increase proportionately with oven temperature. Lighter or darker toast may be produced by manipulation of knob 74 and once this knob is set at the desired point, completely uniform toast will result irrespective of starting oven temperature or periods of waiting between the toasting of successive slices. The temperature of thermostat 60 will also decrease proportionately with oven temperature because of the fact that it is subjected to the natural draft set up through the open bottom of the chamber 50 and passing out of its open top upon a heating up of the heater 62. This prevents the temperature of the thermostat 60 from lagging behind oven temperature as would be the case in the event the thermostat were shielded from draft influences.

While I have shown the toaster as being provided with a perforated bottom allowing a draft through the toasting chamber, it is of course apparent that this oven bottom may be made imperforate if desired.

Having now described my invention, what I claim as new and desire to secure by Letters Patent of the United States is as follows:

1. In an automatic toaster having a toasting chamber, toast heating means within said chamber, and means for supporting a bread slice in position to be toasted by said toast heating means, a heater operated simultaneously with said toast heating means and positioned outside of said toasting chamber, said heater being mounted and positioned so as to set up an air draft when heated, a thermally responsive device subject to the heat from said heater and located in the draft created thereby, and means associated with said thermally responsive device for terminating the toasting of the bread slice.

2. In an automatic toaster having toast heating means, and means for supporting a bread slice in position to be toasted by said toast heating means, a heater operated concurrently with said toast heating means, a chamber for said heater having an opening therein through which an air draft is set up upon operation of the heater, a thermally responsive device within said chamber and subject to the heat from said heater and positioned in the draft created thereby, and means associated with said thermally responsive device for terminating the toasting of the bread slice.

3. In an automatic toaster having electrical toast heating means, and means for supporting a bread slice in position to be toasted by said toast heating means, an electrical heater connected in circuit with said electrical toast heating means and operated simultaneously therewith, a chamber for said heater having an opening therein through which an air draft is set up upon operation of the heater, a thermally responsive device subject to the heat from the heater and positioned in the draft created thereby, and means associated with said thermally responsive device for terminating the toasting of the bread slice.

4. An automatic toaster comprising a toasting chamber, toast heating means within said toasting chamber, means for supporting a bread slice in said toasting chamber in position to be toasted by said toast heating means, a heater removed from and operated concurrently with said toast heating means, a chamber for said heater having an opening through which a draft is set up upon operation of the heater, a thermally responsive device in said heater chamber subject to the heat from the heater and positioned in the draft created thereby, and means associated with said thermally responsive device for terminating the toasting of the bread slice.

5. An automatic toaster comprising a toasting chamber, electrical toast heating means within said chamber, means for supporting a bread slice within said chamber in position to be toasted by said heating means, an electrical heater in circuit with said toast heating means and operated simultaneously therewith, a chamber for said heating means and having an opening through which a draft is set up upon operation of the heating means, a thermally responsive device subject to the heat from the heater and also positioned in the draft created thereby, and means associated with said thermally responsive device for terminating the toasting of the bread slice.

6. An automatic toaster comprising a toasting chamber, electrical toast heating means within said chamber, means for supporting a bread slice in position to be toasted by said heating means, an electrical heater in circuit with said toast heating means and operated simultaneously therewith, said heater being located outside of said toasting chamber and being arranged to produce a draft upon being heated, a thermally responsive device exposed to the radiant heat of said heater and located in the path of the draft created thereby, means including a timing mechanism for terminating the toasting of bread slices, and means associated with said thermally responsive device for controlling the operation of said timing mechanism.

7. An automatic toaster comprising a toasting chamber, electrically operated toast heating means within said chamber, means for supporting a bread slice in position to be toasted by said heating means, an electrical heater in circuit with said toast heating means and adapted to be operated simultaneously therewith, a chamber for said heater having an opening therein through which a draft is set up upon operation of the heater, said heater chamber being located outside of said toasting chamber, a thermally responsive device located within said heater chamber exposed to the heat given off by the heater and located in the path of the draft created thereby, timing means, means associated therewith for terminating the toasting of bread slices, and means associated with said thermally responsive device for controlling the operation of said timing means.

8. An automatic toaster comprising a toasting chamber, heating means therein, means for carrying slices into and removing the same from said chamber, a heater operated concurrently with said heating means and located outside of said toasting chamber and arranged to set up a draft when heated, a thermally responsive device exposed to the heat of the heater and located in the path of the draft created thereby, and means associated with said thermally responsive device for controlling said means for removing the bread slices from the oven.

9. An automatic toaster comprising toast heating means, means for moving a bread slice into and away from position to be toasted by said heating means, a variable speed clock controlling said moving means, a heater operated concurrently with said toast heating means, and a thermally responsive device exposed to heat given off by said heater and also exposed in the draft created thereby, said thermally responsive device being operatively connected to said variable speed clock to regulate the same.

10. In an automatic toaster having toast heating means, and means for supporting a bread slice in position to be toasted by said toast heating means, a heater remotely located from and operated simultaneously with said toast heating means, said heater being mounted and positioned so as to set up an air draft when heated, a thermally responsive device subject to the heat from said heater and located in an air draft set up thereby, and means associated with said thermally responsive device for terminating the toasting of the bread slice.

11. In an intermittently operated automatic toaster having toaster heating means and for supporting a bread slice to be toasted by said t...

iliary heater and located in the draft created by the latter.

12. An intermittently operated automatic toaster of bread slices and the like including, in combination, toaster-heating means, an auxiliary heater positioned remotely from said toaster-heating means but co-operatively connected thereto for heating action concurrently therewith, a manually operable device with the toaster-heating